(12) United States Patent
Iwano et al.

(10) Patent No.: US 6,459,470 B1
(45) Date of Patent: Oct. 1, 2002

(54) IMAGE PRINTER FOR CONTROLLING THE SHAPE OF PIXELS BASED UPON CORRELATION VALUES

(75) Inventors: Kenji Iwano; Hiroshi Akahori; Kunio Nobori, all of Osaka; Kazuhiro Kayashima, Kanagawa; Makoto Fujimoto, Kyoto; Yasuhito Kawamata, Ehime, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/344,498

(22) Filed: Jun. 25, 1999

(30) Foreign Application Priority Data

Jun. 25, 1998 (JP) .............................................. 10-178921

(51) Int. Cl.$^7$ .......................... G03B 27/32; G06K 9/38; G06K 15/00

(52) U.S. Cl. ......................... 355/32; 382/270; 358/3.27

(58) Field of Search ............................. 355/32, 22, 33, 355/77; 353/7; 359/463; 358/298; 348/258, 270

(56) References Cited

U.S. PATENT DOCUMENTS

| 5,408,329 A | * | 4/1995 | Mailloux et al. ............ 358/298 |
| 5,781,225 A | * | 7/1998 | Syracuse et al. ............. 347/258 |
| 5,898,800 A | * | 4/1999 | Gahang ....................... 382/270 |

FOREIGN PATENT DOCUMENTS

EP          0 570 806          5/1993

* cited by examiner

Primary Examiner—Russell Adams
Assistant Examiner—Peter B. Kim
(74) Attorney, Agent, or Firm—Wenderoth, Lind & Ponack, L.L.P.

(57) ABSTRACT

An image printer for printing images with less cross-talk between images and less image flickering is provided. A plurality of images are interleft in one or a plurality of line units and a lenticular lens is used to make it possible for each individual pixel to be distinguished. The difference in brightness between an attentional pixel and the surrounding pixels that surround this attentional pixel is taken, and a correlation value is produced, the correlation value being reduced if the difference is large and increased if the difference is small. The image printer is equipped with a pixel shape controller that makes the printed pixels smaller in a region where the correlation value is low, and makes the printed pixels larger in a region where the correlation value is high.

21 Claims, 16 Drawing Sheets

WHEN Co=0

WHEN Co=1

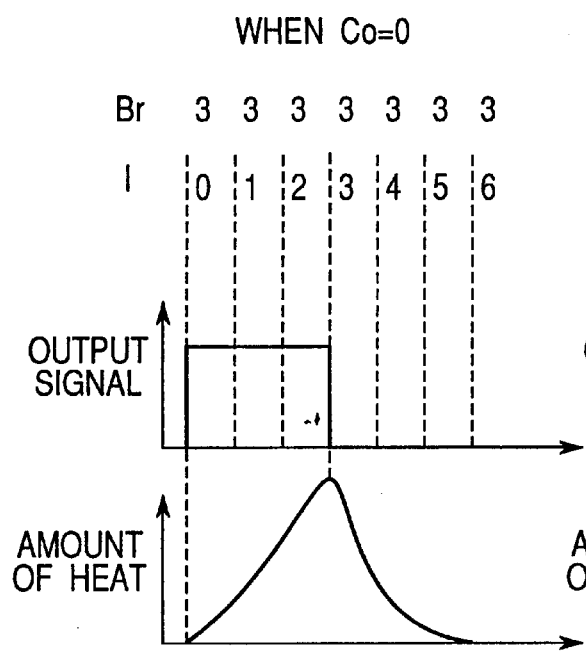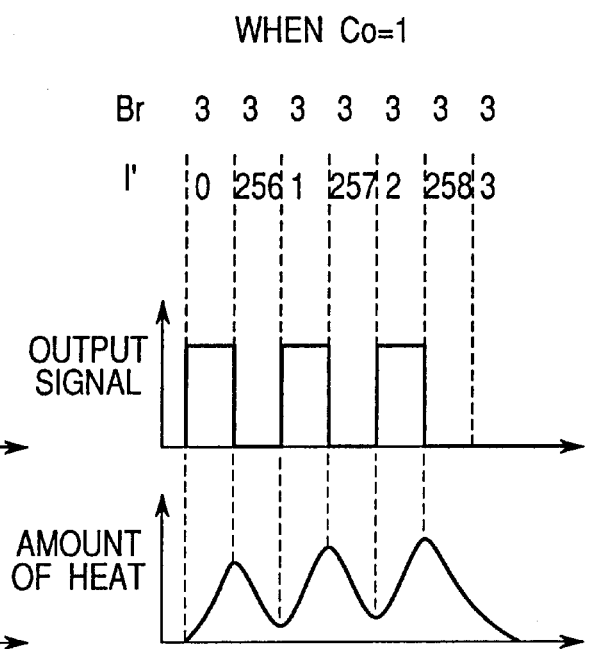

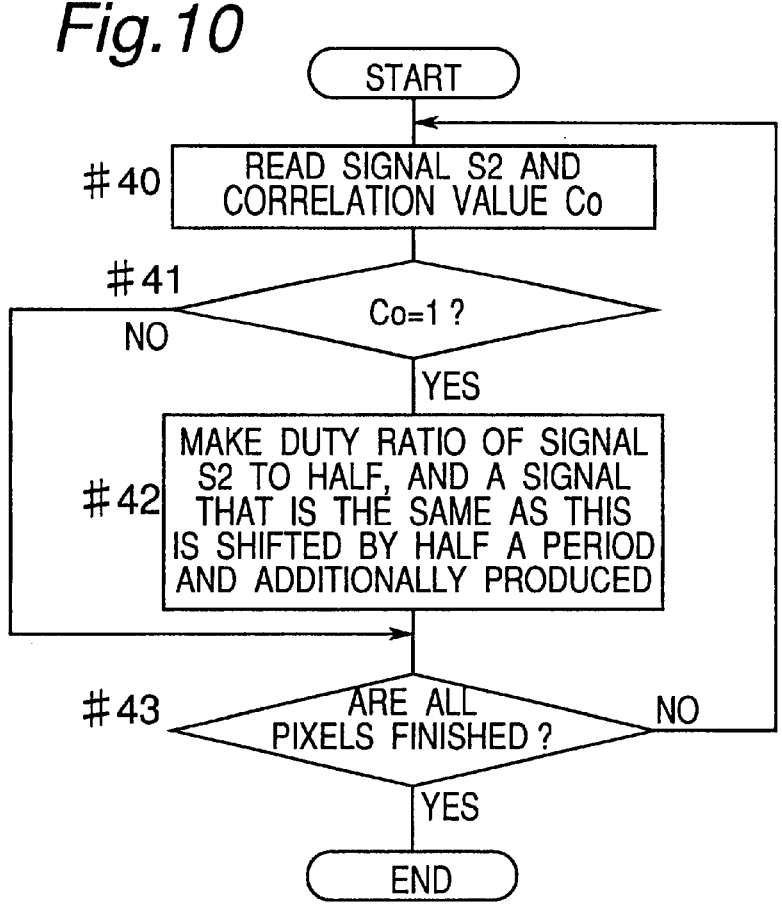
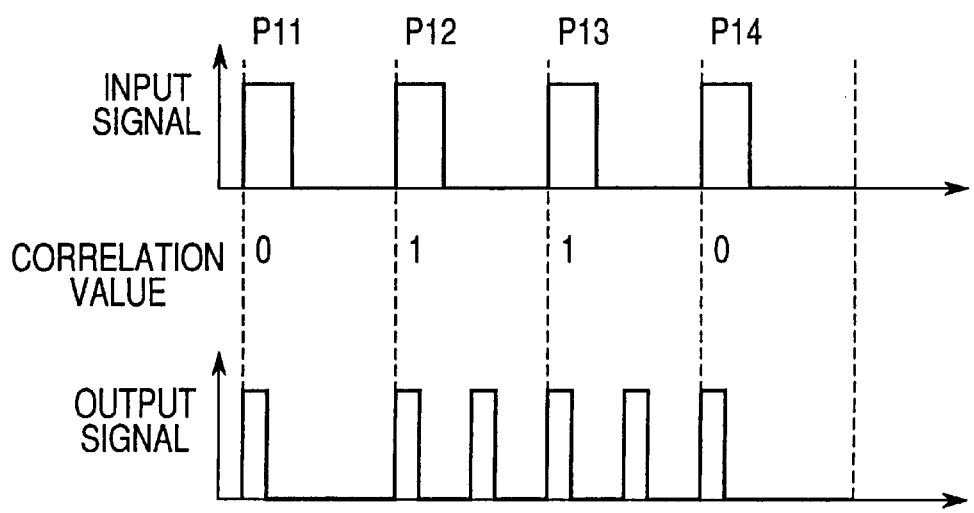

ONE PIXEL OF SURFACE AREA GRADIENT EXPRESSION

ONE PIXEL OF BINARY GRADIENT EXPRESSION

IMAGE PRINTER FOR CONTROLLING THE SHAPE OF PIXELS BASED UPON CORRELATION VALUES

BACKGROUND OF THE INVENTION (1) Field of the Invention

The present invention relates to an apparatus for printing a plurality of images on the back of a lenticular sheet, for example, with which different images are seen depending on the viewing direction.

(2) Description of Related Art

A method known in the past for making a picture, photograph, or the like appear three-dimensional was to stick a lenticular sheet composed of a plurality of semicircular lenses onto a picture of photograph printed so as to correspond to the left and right eyes. As shown in FIG. 25 images A1 and A2 for the left eye and images B1 and B2 for the right eye are printed in stripes on a paper 2503, and when the resulting printed picture is viewed through the above-mentioned lenticular sheet stuck on top 2501, the images A1 and A2 are seen by the left eye, while the images B1 and B2 are seen by the right eye, which makes the images look three-dimensional. In FIG. 25, two types of images are printed, one for the right eye and one for the left, but if this is taken further so that six sheets of images are printed as shown in FIG. 26, then a stereo-image for six eyes can be produced, and if six sets of moving images are printed and viewed through a lenticular lens from the side as shown in FIG. 26, six sheets of moving images can be printed on a single card.

FIG. 27 is a structural diagram of a conventional image printer for printing N number (such as six) of images on a lenticular sheet. This image printer consists of an image input device 101 for fetching N number of images Br from a data recording apparatus or graphic signals from a camera or the like, an image synthesizer 2701 for synthesizing the N number of images Br and producing a shaded image So for printing, and an image output device 104 for printing from the shaded image So.

With a conventional printing method, the printing was performed by making the printed pixels smaller as shown in FIG. 30 in order to reduce cross-talk (a phenomenon whereby part of another image can be seen when one image out of the plurality of images printed on the lenticular sheet is viewed.) FIG. 28 illustrates the situation when the images in FIG. 30, produced by printing stripes of images containing one letter each of the letters A through F in the first to sixth places using the above printing method, are viewed through a lenticular sheet. The letters A through F can be viewed separately by varying the angle of the sheet when it is viewed. Cross-talk is reduced with this printing method, but as can be seen from FIG. 30, there is a large area between the pixels where there is no printing. As a result, although the individual images can be viewed separately when the sheet is viewed at different angles, a problem is that the images seem to flicker when viewed continuously due to a higher proportion of white space during switching from one image to the next.

This flickering can be reduced if the printed pixels are made larger as shown in FIG. 31. However, when the images in FIG. 31 are viewed through a lenticular sheet, the problem of increased cross-talk, as shown in FIG. 29, is experienced which prevents each letter from being viewed separately.

BRIEF SUMMARY OF THE INVENTION

In order to solve these problems, an object of the present invention is to provide an image printer with less flickering and less cross-talk, which is accomplished by utilizing information about correlation with surrounding pixels to control the printing.

The first aspect of the present invention is an image printer for printing images, wherein the image printer comprises: correlation value generation device operable to take the difference between an attentional pixel and the surrounding pixels that surround this attentional pixel, lower the correlation value if the difference is large, and raise the correlation value if the difference is small; and pixel shape control device operable to make the printed pixels smaller in the region where the correlation value is low and to make the printed pixels larger in the region where the correlation value is high.

This makes it possible to print images with less flickering and less cross-talk.

The second aspect of the present invention is an image printer as defined in the first aspect, wherein the shape control device comprises: a count device operable to count time increments during the printing period allotted to a single pixel and output a count value as N bits; a bit shift device operable to shift the least significant bit of the N-bit count value to the most significant bit and output a corrected count value; a switch device operable to select an uncorrected count value from the count device when the correlation value is low and to select a corrected count value from the bit shift device when the correlation value is high; and a comparison device operable to compare the corrected or uncorrected count value from the switch device with a brightness signal expressing the brightness level of the attentional pixel, and to output a signal that raises the printing level when the brightness signal is larger.

This makes it possible to print images such that small dots are distinguished from large dots with a simple structure.

The third aspect of the present invention is an image printer as defined in the second aspect, wherein the brightness signal is expressed as (N−1) bits or a smaller number of bits.

This makes it possible for the heating period and cooling period of the thermal head of the printer to have a ratio of at least 1:1, or for the cooling period to be longer than the heating period.

The fourth aspect of the present invention is an image printer as defined in the first aspect, further comprising: a device operable to detect whether pixels with a high correlation value are present around a pixel with a low correlation value and designate the pixel with a low correlation value as a boundary pixel; and a position control device operable to control the pixel position such that the boundary pixel is moved toward the pixels with a high correlation value. As a result, the distance between pixels is widened at the boundaries, which makes the boundaries more distinct and allows cross-talk to be reduced.

The fifth aspect of the present invention is an image printer as defined in the first aspect, further comprising: a device operable to detect pixels with a high correlation value; and a density control device operable to control the pixel density so that the pixels with a high correlation value will be printed a plurality of times. As a result, the portion with a high correlation value will have higher dot density, and flickering will be eliminated.

The sixth aspect of the present invention is an image printer as defined in the first aspect, further comprising: a device operable to distinguish between pixels with a low correlation value and pixels with a high correlation value; and a device operable to perform gamma correction separately for pixels with high and low correlation values. This makes it possible to perform gamma correlation separately for portions with a high correlation value and portions with a low correlation value.

The seventh aspect of the present invention is an image printer as defined in the first aspect, wherein the image printer is an image printer operable to print images viewed in combination with a lenticular lens, wherein the angle in the direction of the lenticular lens is matched to that in the print scan direction.

The eighth aspect of the present invention is an image printer as defined in the first aspect, wherein the image printer is an image printer operable to print images viewed in combination with a lenticular lens, wherein the shape of the printed pixels is varied via the lens pitch of the lenticular lens. This makes it possible to perform printing that matches the lens pitch.

BRIEF DESCRIPTION OF THE SEVERAL VIEWS OF THE DRAWING

FIGS. 6A and 6B are waveform diagrams illustrating an example of the output signals of the shape controller;

FIG. 10 is a flow chart of the operation of the density controller;

FIG. 11 is a waveform diagram illustrating an example of the output signal of the density controller;

DETAILED DESCRIPTION OF THE INVENTION

Figure 1:
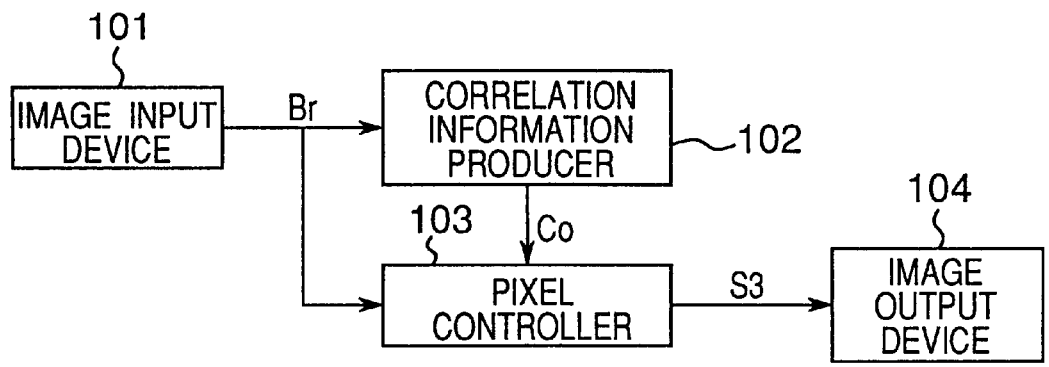
FIG. 1 is a block diagram of an image printer according to the present invention.

FIG. 1 is a structural diagram of an image printer in a preferred embodiment of the present invention. The image printer comprises an image input device 101 for receiving N number of images from a data recording apparatus or graphic signals from a camera or the like, a correlation information producer 102 for receiving a brightness signal Br for each of the N number of images and producing correlation information, a pixel controller 103 for controlling the size of the pixels, the position of the pixels, and the density of the pixels during the printing of the pixels, and an image output device 104 for outputting an image. The image output device 104 is primarily a printer for performing printing, but may instead be some other output apparatus.

Figure 2:
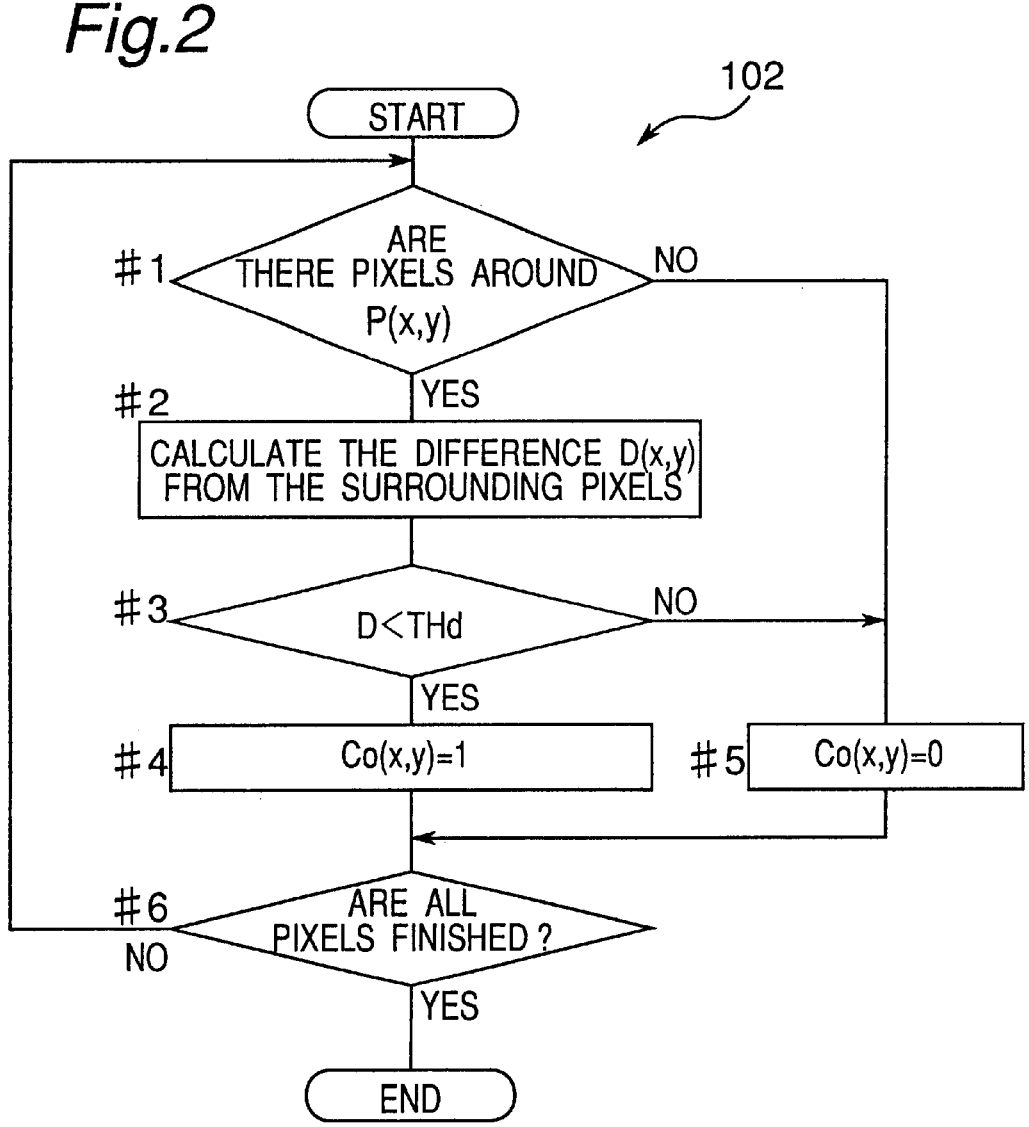
FIG. 2 is a flow chart of the operation for obtaining a correlation value.

FIG. 2 is a flow chart showing the flow of operation in the correlation information producer 102. The flow chart comes into play once a single image has been sent.

In step #1, a decision is made as to whether pixels are present above or below or to the left or right with respect to the pixel to be tested (the attentional pixel P (x, y)). As a result, a decision of NO is made for the surrounding pixels on the screen (the two horizontal rows above and below and the two vertical rows to the left and right, for a total of four rows of pixels), and a decision of YES is made for the remaining pixels.

In step #2, a difference D between the attentional pixel and its surrounding pixels is calculated. This difference D is calculated by the following equation.

$$D=|Br(x, y)-Br(x+1, y)|+|Br(x, y)-Br(x-1, y)|+|Br(x, y)-Br(x, y+1)|+|Br(x, y)-Br(x, y-1)|$$

Here, Br (x, y) indicates the brightness (luminance) of the pixel P (x, y). The above equation and the following description are given for brightness in the case of black and white pictures, but in the case of color pictures, the equation and description apply to red, green, and blue or they may apply just to green and omitted for red and blue, or and estimate made from green may be used.

The difference D may also be the sum of the squares of the various terms in the above equation. Also, the difference D may be only in the x direction or only in the y direction.

In step #3, a decision is made as to whether the difference D is less than a specific threshold Thd. This threshold Thd is set to a value such that the output image can be viewed and a decision made as to whether the pixel is on the boundary line of a portion of the picture (such as at the boundary between a flower and the background color). If the difference D is greater than the threshold Thd, the pixel is judged to be on the boundary line, and if it is less than the threshold Thd, the pixel is judged not to be on the boundary line. The threshold Thd may be a fixed value or it may be variable. If it is variable, it may be varied manually, or it may be varied automatically according to factors such as the type of image or the brightness of the image.

If D<Thd, it is decided that there is little difference between the attentional pixel and the surrounding pixels, and it is decided that the correlation value Co of the attentional pixel with respect to the surrounding pixels is high, that is, that the attentional pixel expresses the same portion as the surrounding pixels (such as the same portion of a face). Therefore, if D<Thd, the correlation value Co (x, y) is set to 1 for the attentional pixel P (x, y) in step #4.

Conversely, if D≧Thd, it is decided that there is a large difference between the attentional pixel and the surrounding pixels, and it is decided that the correlation value Co of the attentional pixel with respect to the surrounding pixels is low, that is, that the attentional pixel expresses a different portion from that of the surrounding pixels (for instance, the attentional pixel expresses the edge of a face and some of the surrounding pixels express the background portion of the face). Therefore, if D≧Thd, the correlation value Co (x, y) is set to 0 for the attentional pixel P (x, y) in step #5.

In step #6, a decision is made as to whether the correlation value has been taken for all of the pixels of a single image, and if the correlation value has not been taken for all of the pixels, the flow returns to step #1, and if they have all been taken, the flow is concluded.

In the example in FIG. 2, the correlation value Co was set to either 0 or 1 by comparison of the difference D with a single threshold Thd, but two thresholds may be used and the correlation value set to either 0, 1, or 2. It is also possible for finer distinctions to be made.

The production of a correlation image requires comparison with the surrounding pixels, but in the case of printing on a lenticular lens, the amount of calculation can be reduced by making a comparison with nearby pixels in the vertical direction with respect to the lengthwise direction of the lenticular lens. In the case of printing on a fly's eye lens, it is preferable to make a comparison with the nearby pixels in the vertical and horizontal directions.

Figure 3:
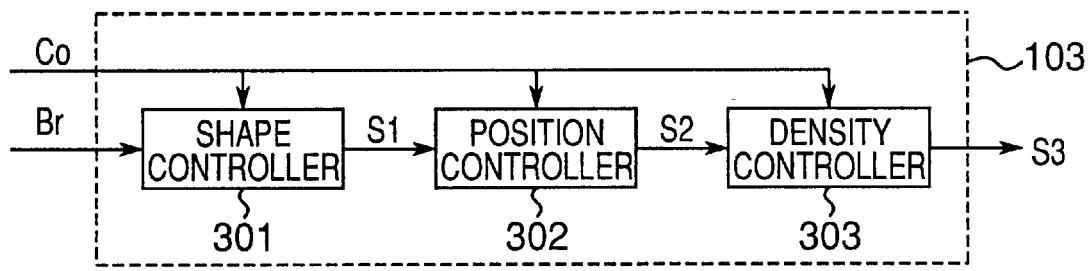
FIG. 3 is a block diagram of the structure of the image controller.

FIG. 3 is a block diagram of the pixel controller 103. The pixel controller 103 consists of a shape controller 301 for controlling the shape (such as the size) of the pixel, a position controller 302 for controlling the position of the pixel, and a density controller 303 for controlling the density of the pixel. The pixel controller 103 does not necessarily have to have all three of the shape controller 301, position controller 302, and density controller 303, and may instead have just one.

Figure 4A:
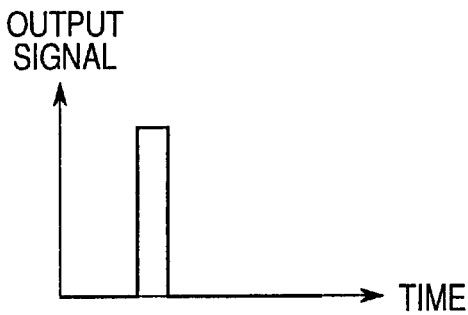
FIGS. 4A and 4B are waveform diagrams illustrating an example of the output signals of the shape controller.
Figure 4B:
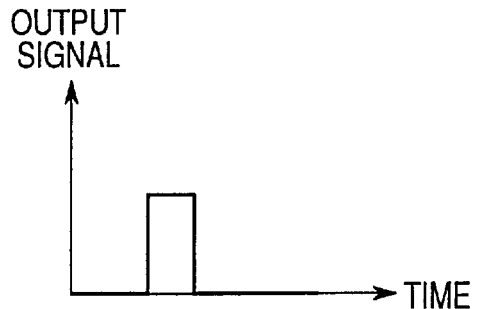

FIG. 4 illustrates examples of the output waveform of the shape controller 301, and in particular shows the output waveform in the case of a printer, or more specifically, when the image output device 104 prints at different energy levels. For instance, it shows the output waveform of the shape controller 301 in the case of using a printer with which the printing brightness can be varied among any of 256 different levels according to a single pulse output. When the correlation value Co is 0, that is, when the pixel is located on the boundary line of a portion of a picture, as shown in FIG. 4A, a drive pulse is outputted at a high energy level and for a short duration so as to concentrate a large quantity of heat and perform pixel printing with small dots, but when the correlation value Co is 1, that is, when the pixel is not located on the boundary line of a portion of the picture, as shown in FIG. 4B, a drive pulse is outputted at a low energy level for a longer duration so as to apply a somewhat smaller quantity of heat for a longer time and perform pixel printing with large dots. The pulses shown in FIGS. 4A and 4B have the same surface area.

Figure 12:
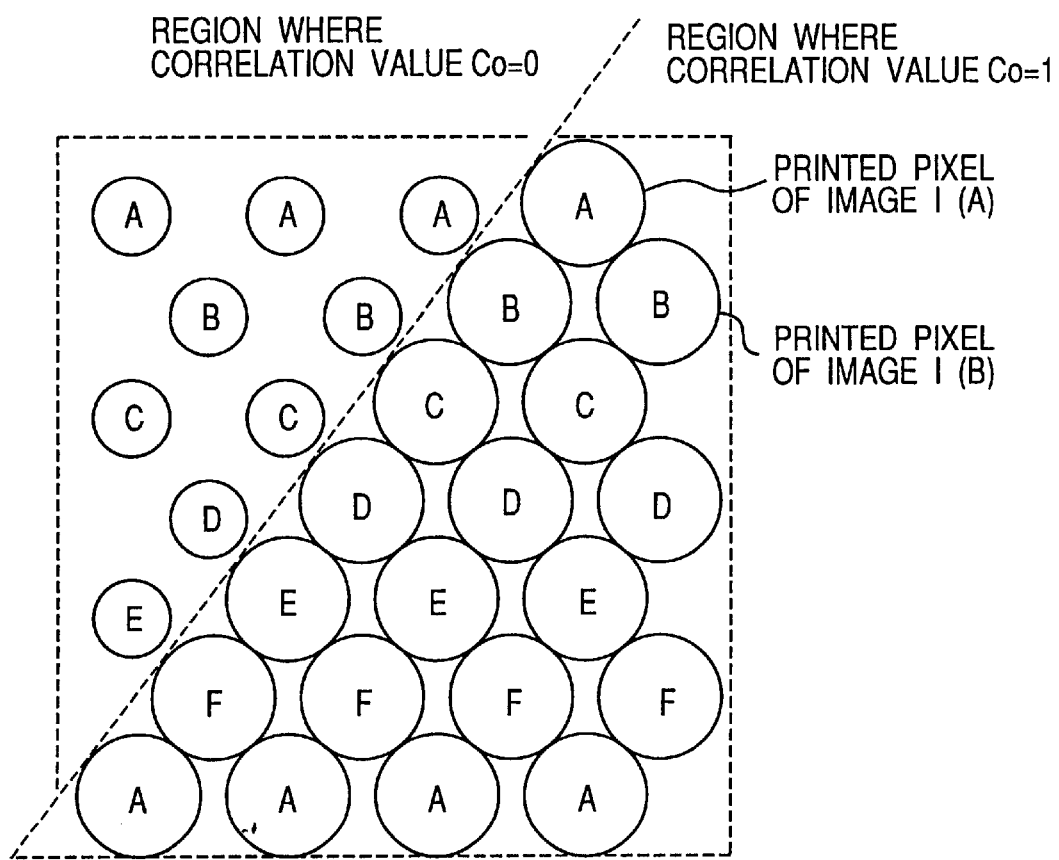
FIG. 12 is a diagram illustrating an example of printing controlled by the shape controller.

For example, if we assume that a brightness signal Br variable from a level of 0 to a level of 255 is at a level of 120, the shape controller 301 will output a signal of level 120 for a duration of one pulse unit when the correlation value Co is 0, and will output a signal of level 60 for a duration of two pulse units when the correlation value Co is 1. Therefore, the image output device 104 will form smaller, darker dots (the dots in the upper left region in FIG. 12) when the correlation value Co is 0, and will form larger, lighter dots (the dots in the lower right region in FIG. 12) when the correlation value Co is 1.

Figure 5:
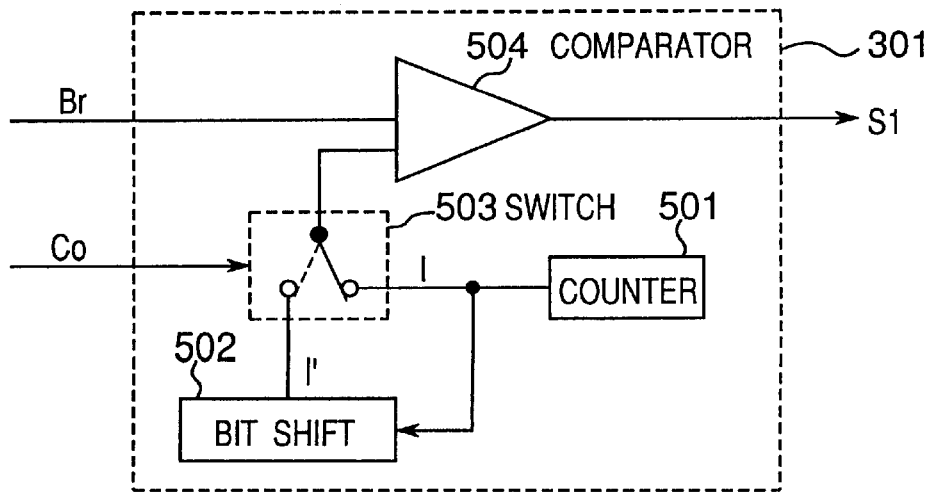
FIG. 5 is a block diagram of the structure of the shape controller.

FIG. 5 is a block diagram of the shape controller 301 when the printer itself can only output at the same energy level (unit energy). In this case, if we assume that a brightness signal Br variable from a level of 0 to a level of 255 is at a level of 120, the printer imparts the unit energy 120 times to a single pixel, heat is accumulated at the thermal head of the printer, and a dot whose brightness level is 120 is produced.

As shown in FIG. 5, the shape controller 301 consists of a counter 501 for counting up to at least two times (512 if there are 9 bits, for example) the Brmax level of maximum brightness (256 if there are 8 bits, for example), a bit shift 502 for shifting the bit by the count value and outputting a corrected count value, a switch 503 for selecting either the count value from the counter 501 or the corrected count value from the bit shift 502, and a comparator 504. The counter 501 counts time increments during the printing period allotted to a single pixel and outputs a count value as N bits (9 bits here).

The bit shift 502 and the corrected count value will now be described. If the counter 501 is a nine-bit counter, it can count from 0 (0 0000 0000) up to 511 (1 1111 1111) (the numbers in parentheses express the value in binary notation). The bit shift 502 shifts all the bits to the right by one bit, and moves the least significant bit (LSB) to the most significant bit (MSB). For instance, if we express the nine bits as (a bcde fghi), this would be expressed as (i abcd efgh) after a bit shift has been carried out. The count value that has undergone this bit shift is called a corrected count value. The following table gives samples of bit shifting.

TABLE 1

| I (decimal notation) | I' (decimal notation) |
| --- | --- |
| 0 0000 0000 (0) | 0 0000 0000 (0) |
| 0 0000 0001 (1) | 1 0000 0000 (256) |
| 0 0000 0010 (2) | 0 0000 0001 (1) |
| 0 0000 0011 (3) | 1 0000 0001 (257) |
| 0 0000 0100 (4) | 0 0000 0010 (2) |
| 0 0000 0101 (5) | 1 0000 0010 (258) |
| 0 0000 0110 (6) | 0 0000 0011 (3) |
| 0 0000 0111 (7) | 1 0000 0011 (259) |
| 0 0000 1000 (8) | 0 0000 0100 (4) |
| 0 0000 1001 (9) | 1 0000 0100 (260) |
| 0 0000 1010 (10) | 0 0000 0101 (5) |
| 0 0000 1011 (11) | 1 0000 0101 (261) |

TABLE 1-continued

| I (decimal notation) | I' (decimal notation) |
|---|---|
| 1 1111 1100 (508) | 0 1111 1110 (254) |
| 1 1111 1101 (509) | 1 1111 1110 (510) |
| 1 1111 1110 (510) | 0 1111 1111 (255) |
| 1 1111 1111 (511) | 1 1111 1111 (511) |

As is clear from the above, the corrected count values I' do not increase linearly, with low-level increments (such as an increase from 0) appearing alternately with high-level increments (such as an increase from 256). Specifically, odd-numbered count values increase as 0, 1, 2, 3, ..., 255, while even-numbered count values increase as 256, 257, 258, 259, ..., 511. To express this in the standard form, if the maximum count of the counter is 2Imax−1, then odd-numbered count values are:

0, 1, 2, 3, ..., Imax−1 and even-numbered count values are:

Imax, Imax+1, Imax+2, Imax+3, ..., 2Imax−1.

It is preferable for the relation between the maximum count value 2Imax−1 and the Brmax level of the maximum brightness signal to be Imax=Brmax.

The present invention is characterized in that the counter 501 counts time increments during the printing period allotted to a single pixel (512, from 0 to 511, in the above example) outputs the count value as N bits, and the brightness signal Br is expressed as (N−1) bits or a smaller number of bits. This makes it possible for the heating period (during which heat is accumulated in the thermal head of the printer) and the cooling period to have a ratio of at least 1:1, or for the cooling period to be longer than the heating period.

Let us now assume that a brightness signal Br variable from a level of 0 to a level of 255 is at a level of 3 when a certain attentional pixel is viewed. Therefore, the brightness signal Br, which is one of the inputs to the comparator 504, is given as 3.

When the correlation value Co is 0, the switch 503 is set as indicated by the solid line in FIG. 5, and the uncorrected count value I from the counter 501 is applied to the other input of the comparator 504. As shown in FIG. 6A, output is continued at a high level from the comparator 504 during the three pulse periods while the uncorrected count value I goes from 0 to 2, and output is continued at a low level during the 509 pulse periods while the uncorrected count value I goes from 3 to 511. The output signal S1 from the comparator 504 is sent to the image output device 104, which is a printer (when the position controller 302 and the density controller 303 are omitted).

At the printer, heat is accumulated according to the high level of the output signal S1 for the attentional pixel. This accumulation of heat is expressed by a single high peak, as shown in FIG. 6A, with a large amount of heat being concentrated, so it is possible to print pixels with smaller dots (the dots in the upper left region in FIG. 12).

When the correlation value Co is 1, the switch 503 is set as indicated by the broken line in FIG. 5, and the corrected count value I' from the bit shift 502 is applied to the other input of the comparator 504. As shown in FIG. 6B, the corrected count value I' is always larger than the brightness Br when the corrected count value I' is even-numbered, and output is at a high level for the three pulse periods from 0 to 2 when the corrected count value I' is odd-numbered. Therefore, the output alternates between high and low levels during the six pulses while the corrected count value I' goes from 0 to 256, 1, 257, 2, and 258, and the output is continued at a low level during the 506 pulses while the corrected count value goes from 3 to 511. The output signal S1 from the comparator 504 is sent to the image output device 104, which is a printer. At the printer, heat is accumulated according to the high level of the output signal S1 for the attentional pixel. This accumulation of heat is expressed by a number of low peaks, as shown in FIG. 6B, with a somewhat smaller amount of heat being applied over a longer time. It is therefore possible to print pixels with larger dots (the dots in the lower right region in FIG. 12).

Figure 7:
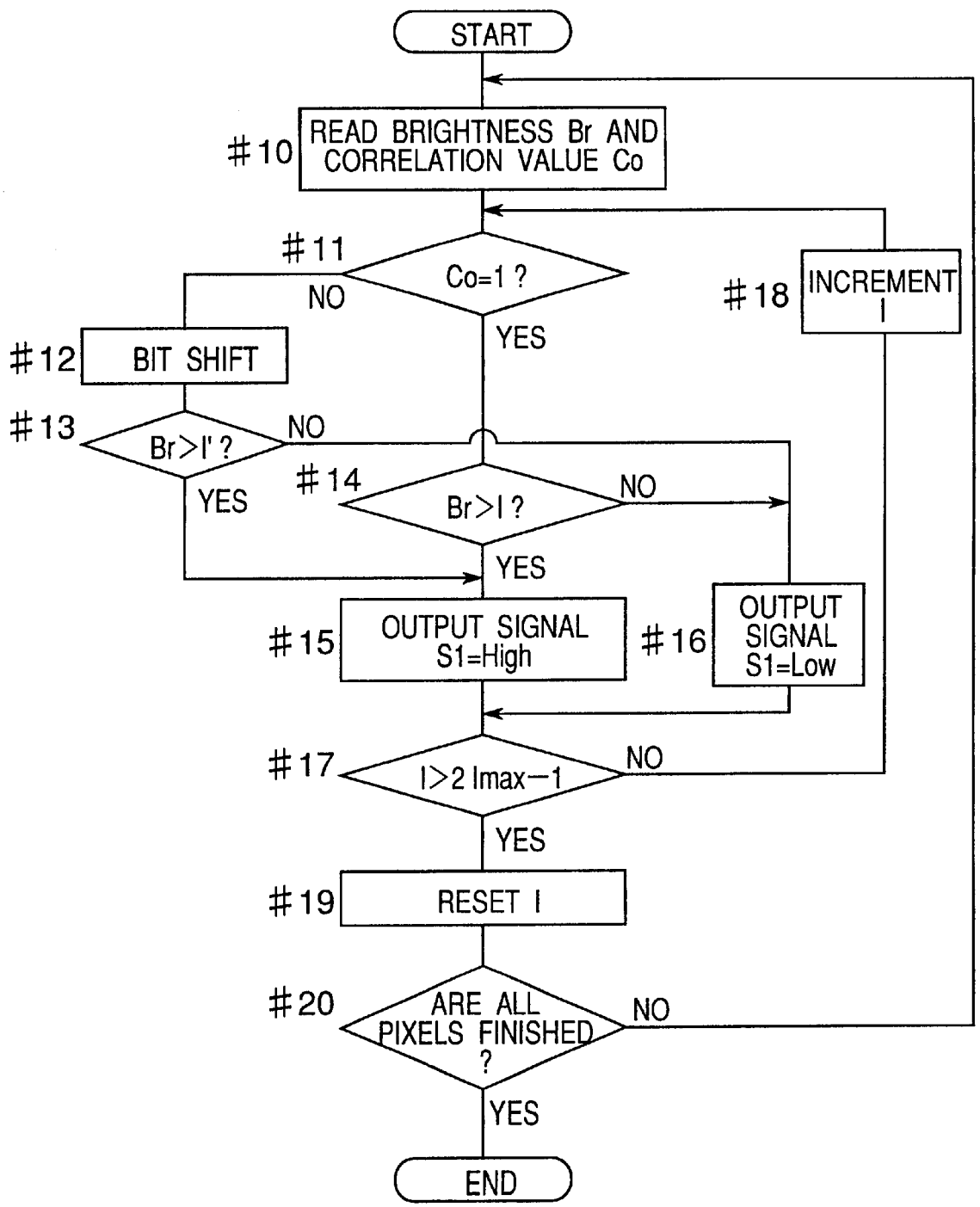
FIG. 7 is a flow chart of the operation of the shape controller.

FIG. 7 is a flow chart of when the shape controller 301 is processed with computer software.

In step #10, the brightness Br and the correlation value Co are read.

In step #11, a decision is made as to whether the correlation value Co is 0 or 1. If the surrounding pixels are similar, that is, if Co=1, the flow ends at step #14, but if the surrounding pixels are not similar, that is, if Co=0, the flow ends at step #12.

In step #14, the brightness Br is compared with the uncorrected count value I, and if Br>I, the flow proceeds to step #15 and there is a high-level output from the output signal S1. If Br≦I, the flow proceeds to step #16 and there is a low-level output from the output signal S1.

In step #12, the counter undergoes bit shifting and the corrected count value I' is calculated.

In step #13, the brightness Br is compared with the corrected count value I', and if Br>I', the flow proceeds to step #15 and there is a high-level output from the output signal S1. If Br≦I', the flow proceeds to step #16 and there is a low-level output from the output signal S1.

In step #17, a decision is made as to whether the count value of the counter has reached the maximum value 2Imax−1, and if it has not, the counter is increased by an increment in step #18, but if it has, the counter is reset in step #19.

In step #20, a decision is made as to whether all of the pixels have been processed, and if they have not, the flow returns to step #10, but if they have, the processing is concluded.

If the printing at the printer is performed in six bits, that is, in 64 gradients from level 0 to level 63, then the brightness signal Br of 256 gradients expressed in eight bits must be converted into a signal of 64 gradients. In this case, the second lowest bit of the eight-bit brightness signal Br is temporarily held as K, and the two lowest bits are deleted to end up with six bits. K is added to the least significant bit of the six bits to create new six-bit data. The purpose of this addition of K is to perform an operation similar to rounding for the lower two bits that have been dropped, and is not necessarily required. Meanwhile, the counter is a seven-bit counter that produces an uncorrected count value I and a corrected count value I' just as above, so that when the correlation value Co is 0, the six-bit brightness signal Br is compared with the seven-bit uncorrected count value I'. When the correlation value Co is 1, the six-bit brightness signal Br is compared with the seven-bit corrected count value I'. The comparison results are outputted as S1.

Figure 8:
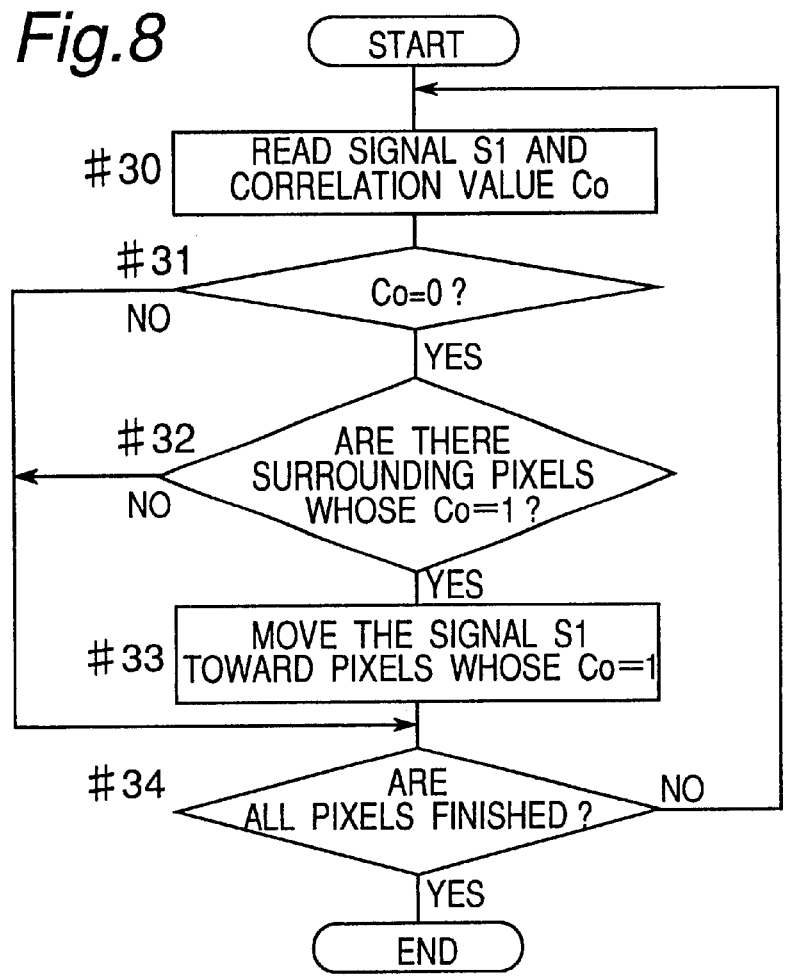
FIG. 8 is a flow chart of the operation of the position controller.

FIG. 8 is a flow chart of the operation of the position controller 302. In step #30, the output signal S1 and the correlation value Co are read.

In step #31, a decision is made as to whether the correlation value Co is 0 or 1. If it is 0 (when the surrounding pixels are not similar), the flow proceeds directly to step #32. If it is 1 (when the surrounding pixels are similar), the flow proceeds to step #34.

In step #32, a decision is made as to whether pixels whose correlation value Co is 1 (similar pixels) are present in the surrounding area. If there are such pixels present, the flow proceeds to step #34, and if not, the flow proceeds to step #33.

In step #33, the position of the attentional pixel P (x, y) is moved slightly, say, by 5 to 20% of the distance between the pixels, in the direction where pixels whose correlation value Co is 1 (similar pixels) are present. A pixel output signal S2 containing information about the new position after this movement is then outputted.

In step #34, a decision is made as to whether all of the pixels have been processed, and if they have not, the flow returns to step #30, and if they have, the flow is concluded.

Figure 9:
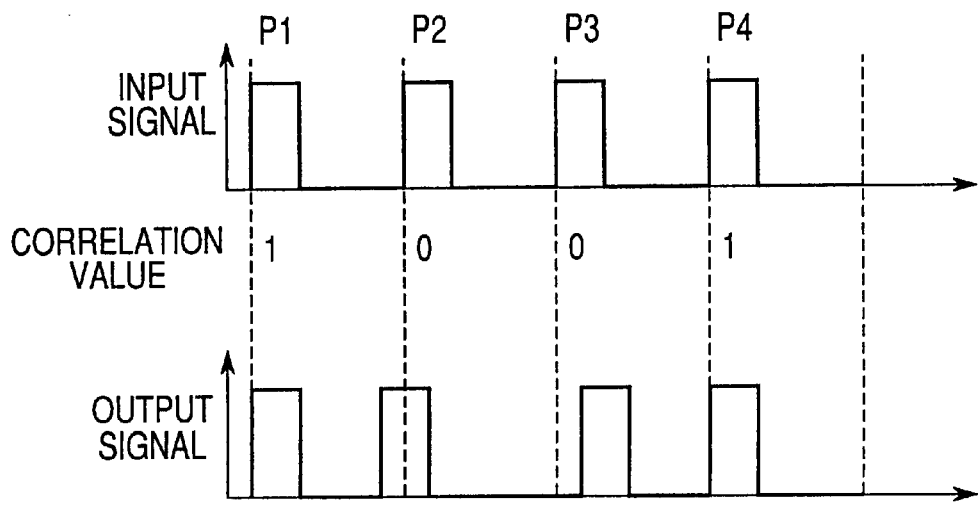
FIG. 9 is a waveform diagram illustrating an example of the output signal of the position controller.
Figure 13:
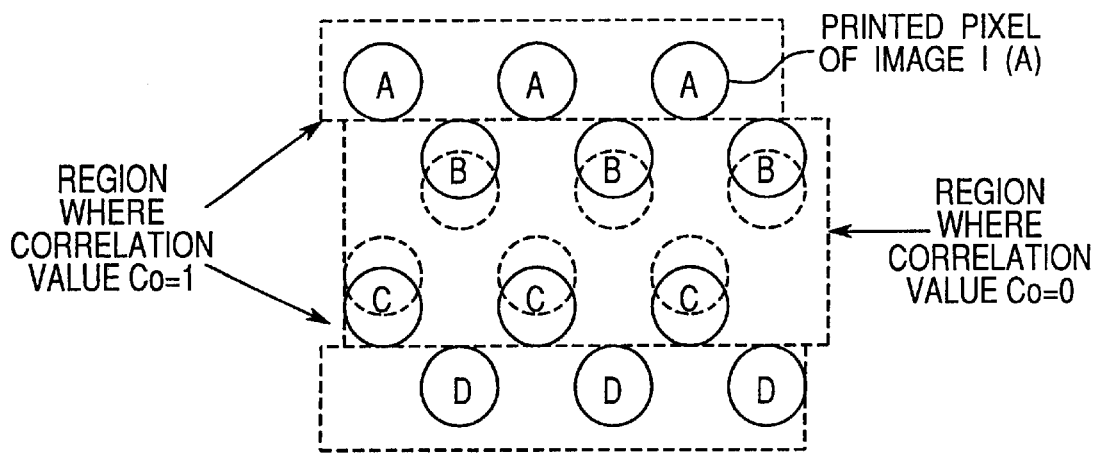
FIG. 13 is a diagram illustrating an example of printing controlled by the position controller.

FIG. 9 illustrates an example in which there are four pixels P1, P2, P3, and P4, the pixel P2 is moved toward the similar pixel P1, and the pixel P3 is moved toward the similar pixel P4. In this case, there is a boundary line of a portion of the picture between the pixels P2 and P3, and the space is widened at this boundary portion so that no cross-talk will occur. This state is shown in FIG. 13.

FIG. 10 is a flow chart of the operation of the density controller 303.

In step #40, the output signal S2 (the output signal S1 when the position controller 302 is omitted) and the correlation value Co are read.

In step #41, a decision is made as to whether the correlation value Co is 1 or 0. If the correlation value Co is 1, that is, if there is similarity, the flow proceeds to step #42. If the correlation value Co is 0, the flow proceeds to step #43.

In step #42, the period of the signal is halved. Specifically, the duty ratio is halved and a signal that has been shifted by half a period is additionally produced. For instance, if the duty ratio is 50%, it is cut to 25% and a signal that is the same as this is shifted by half a period and additionally produced. The frequency is therefore doubled. This produces a new signal S3 with twice the signal density.

In step #43, a decision is made as to whether all of the pixels have been signal processed, and if they have not, the flow returns to step #40, but if they have, the processing is concluded. Therefore, the density controller 303 controls pixels with a high correlation value such that each pixel is printed twice and the pixel density is increased.

Figure 14:
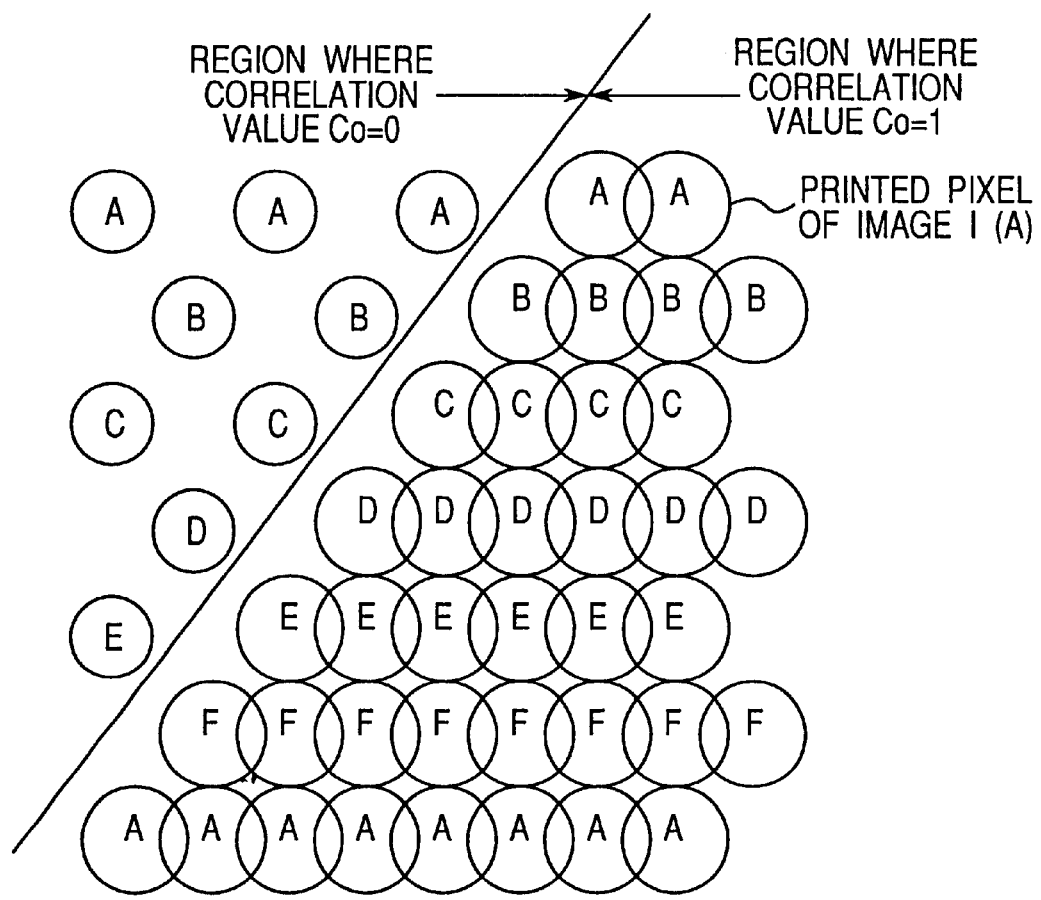
FIG. 14 is a diagram illustrating an example of printing controlled by the density controller.

FIG. 11 illustrates a state in which the processing of step #42 was performed for pulses P12 and P13 whose correlation value Co is 1. This results in a higher printing density. The printing state when the correlation value Co is 0 is illustrated in the upper left part of FIG. 14, and the state when the correlation value Co is 1 and the printing density is higher is illustrated at the lower right.

Figure 15:
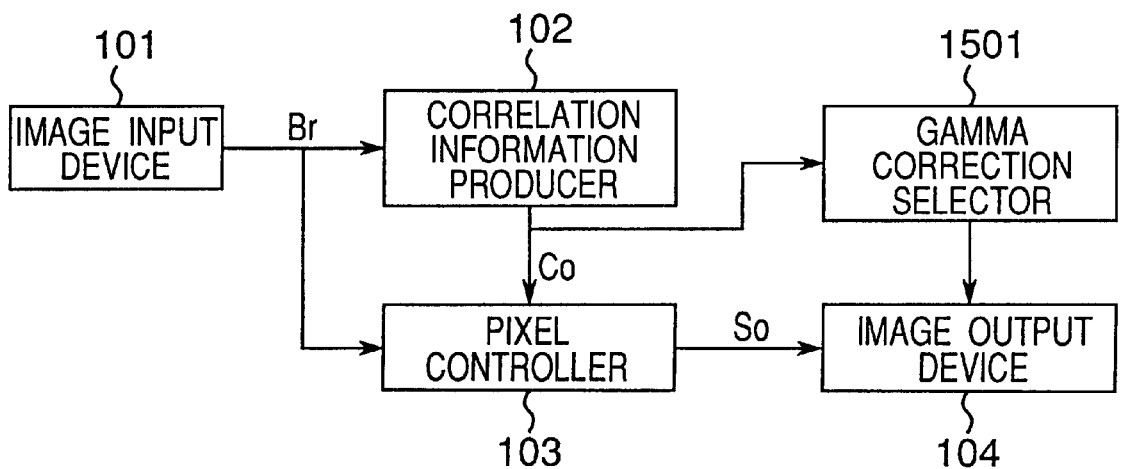
FIG. 15 is a block diagram in which a gamma correction selector has been added to the image printer in FIG. 1.
Figure 16:
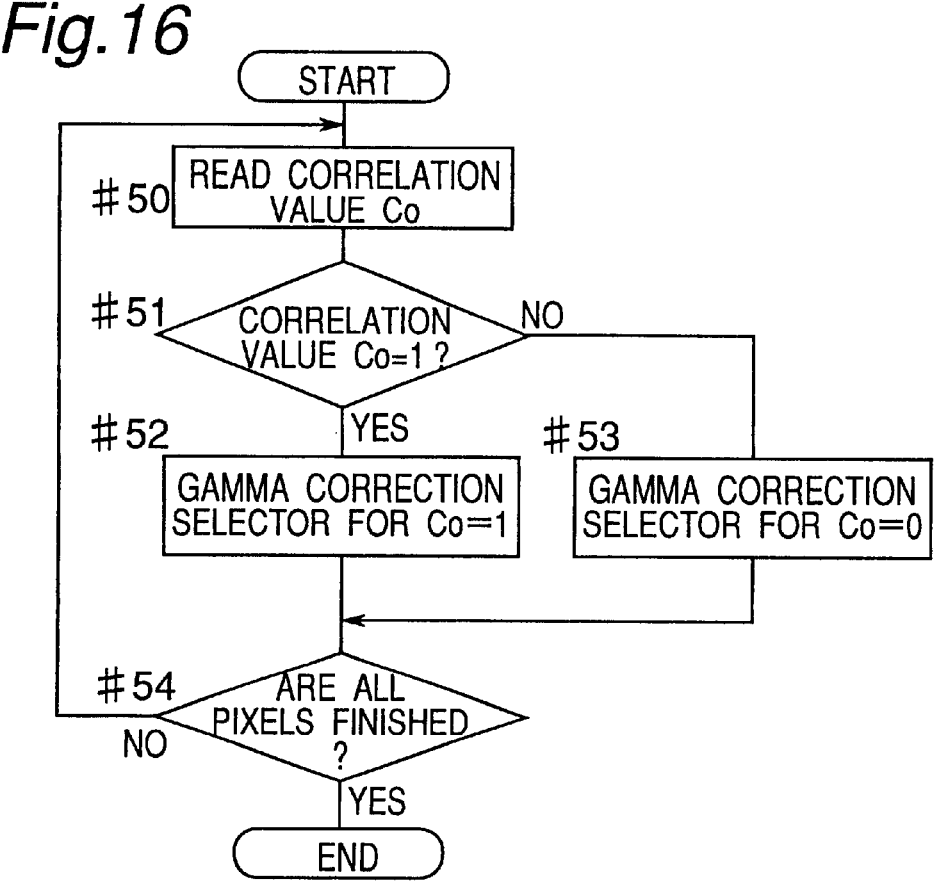
FIG. 16 is a flow chart of the operation of the gamma correction selector.

FIG. 15 illustrates a printer in which a gamma correction selector 1501 is further added to the structure in FIG. 1. FIG. 16 is a flow chart of the operation of the gamma correction selector 1501.

In step #50, the correlation value Co is read.

In step #51, a decision is made as to whether the correlation value Co is 1 or 0. If the correlation value Co is 1, that is, if there is similarity, the flow proceeds to step #52. If the correlation value Co is 0, the flow proceeds to step #53.

In step #52, a gamma correction table or a gamma correction calculation formula is selected, and gamma correction suited to when the correlation value Co is 1 is performed on the basis of the selected table or calculation formula.

In step #53, a gamma correction table or a gamma correction calculation formula is selected, and gamma correction suited to when the correlation value Co is 0 is performed on the basis of the selected table or calculation formula.

In step #54, a decision is made as to whether all of the pixels have been processed, and if they have not, the flow returns to step #50, but if they have, the processing is concluded.

As a result, it is possible for different gamma correction to be performed when the correlation value Co is 1 and when it is 0, so it is possible for adjustment of color (hue, brightness, and saturation) to be performed according to the correlation value Co.

Figure 17:
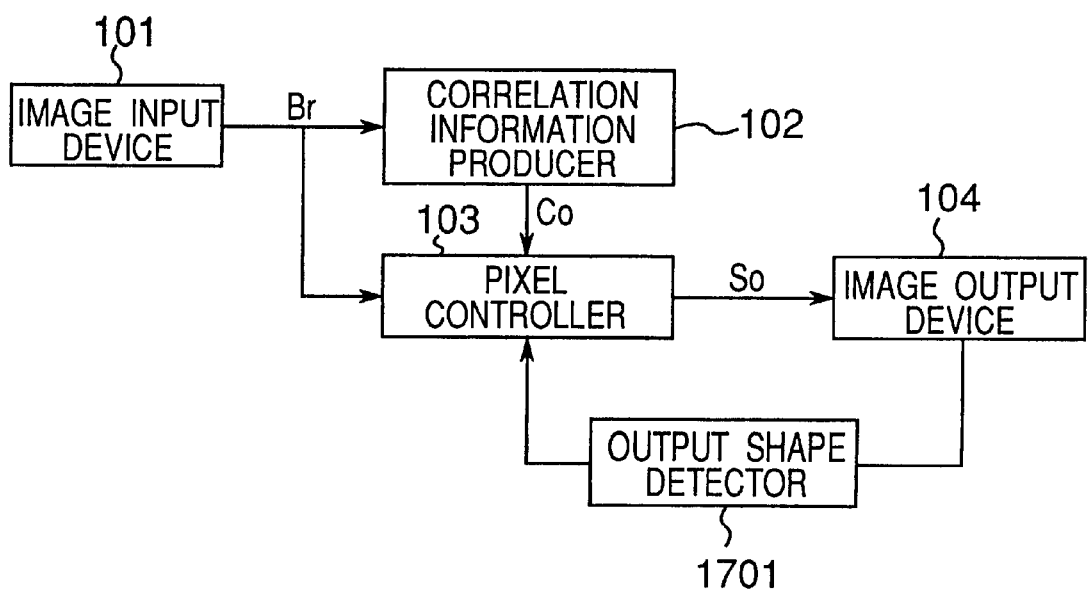
FIG. 17 is a block diagram in which an output shape detector has been added to the image printer in FIG. 1.
Figure 18:
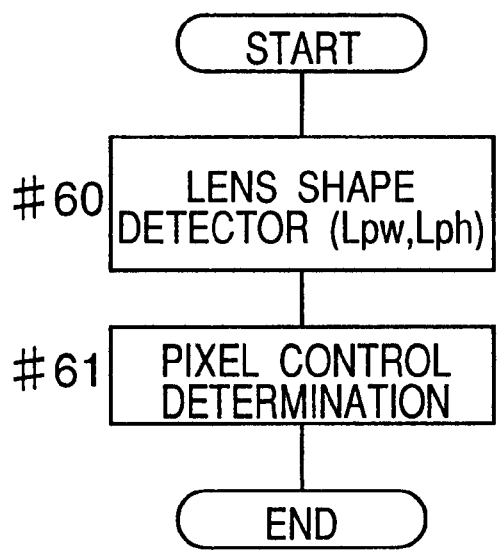
FIG. 18 is a flow chart of the operation of the output shape detector.

FIG. 17 illustrates a printer in which an output shape detector 1701 is further added to the structure in FIG. 1. FIG. 18 is a flow chart of the operation of the output shape detector 1701. The output shape detector 1701 detects the lens shape and controls the pixel controller 103 so that large dots will be formed when the lens shape is large, and small dots will be formed when this shape is small.

Figure 19:
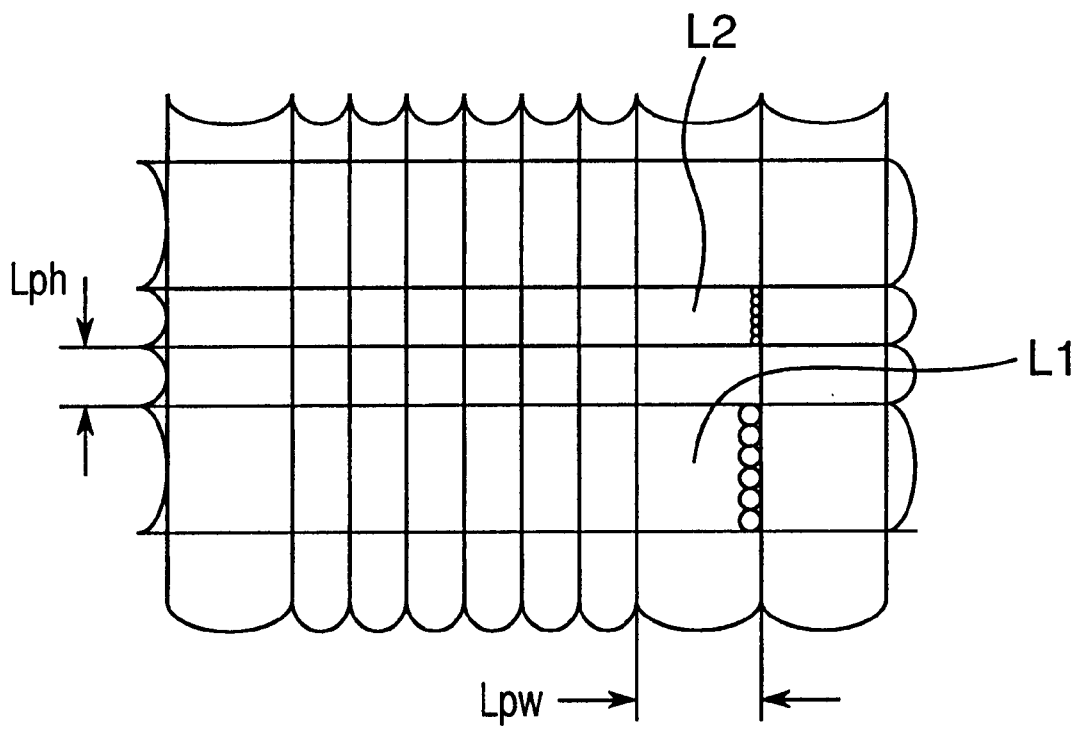
FIG. 19 is a diagram illustrating the shape of a fly's eye lens.

In step #60, the lens pitch of the lenticular lens is detected. The pitch in the width direction is termed Lpw (x, y), and the pitch in the height direction is termed Lph (x, y). The shape of the lens is detected by detecting the pitch in this manner. The shape may be detected, but known information may also be used. FIG. 19 illustrates the lens pitch of a fly's eye lens.

In step #61, the size of the pixels is determined. The lens L1 in FIG. 19 has a large pitch, so the size of the pixels is also controlled so that they will be formed larger in proportion to this pitch. Conversely, lens L2 has a small pitch, so the size of the pixels is also controlled so that they will be formed smaller in proportion to this pitch. This makes it possible to perform printing that is suited to the pitch of the lenses.

Figure 20:
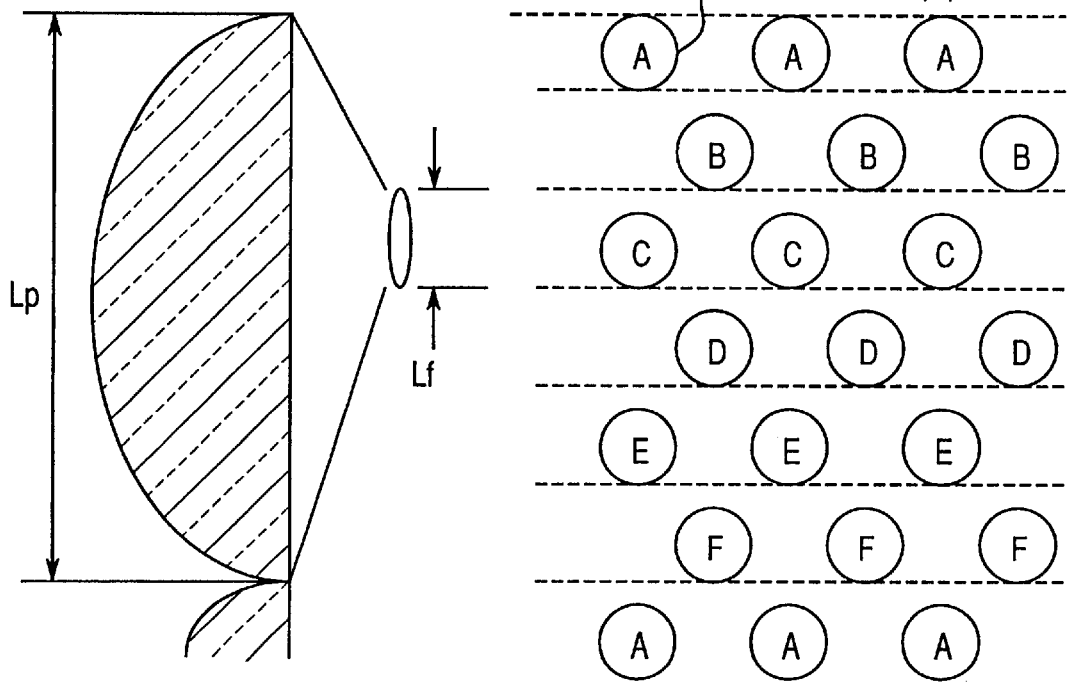
FIG. 20 is a diagram illustrating the relation between the printed pixels and the size of the focal point of the lenticular lens.
Figure 21:
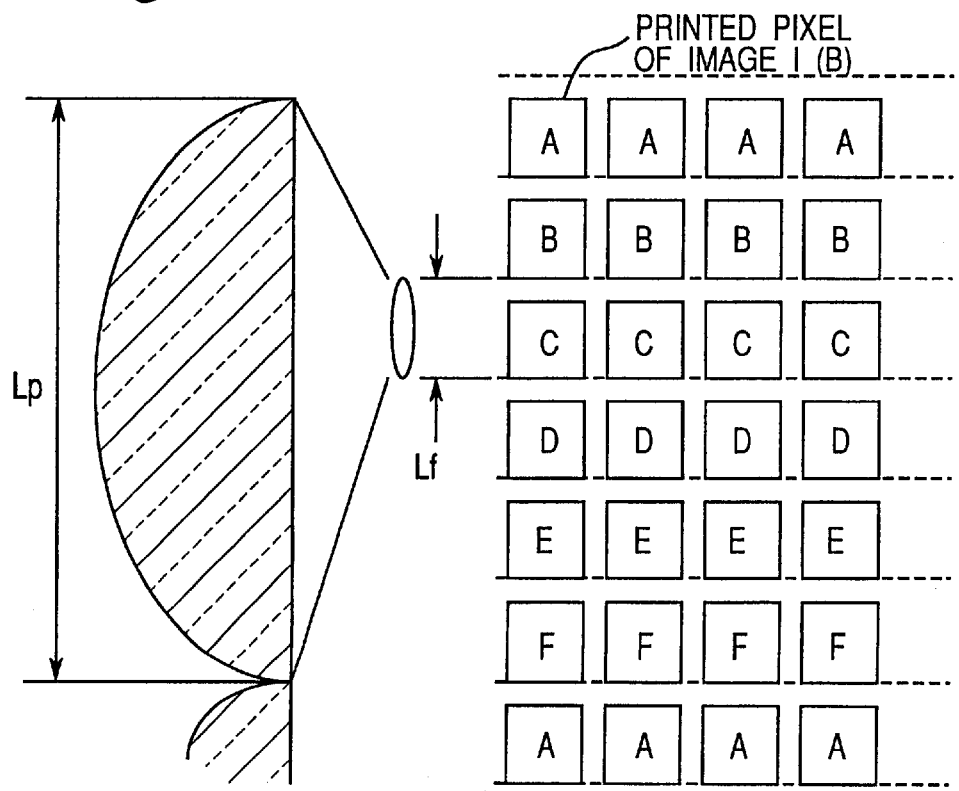
FIG. 21 is a diagram illustrating the relation between the printed pixels and the size of the focal point of the lenticular lens.

FIGS. 20 and 21 illustrate the relation between the lenticular lens and the pixels printed by the printer pertaining to the present invention. In particular, FIG. 20 illustrates a case in which the printed pixels are expressed in multiple gradients, while FIG. 21 illustrates a case in which the printed pixels are expressed surface area gradients. In the Figs., Lf is the size of the focal point of the lenticular lens, and Lp is the lenticular lens pitch. If the printed surface is viewed through the lenticular lens from a certain angle, only those pixels labeled A can be seen. Viewed from another angle, only those pixels labeled B can be seen. Thus, six different types of graphics, from A to F, are printed on a single surface, and it is possible to distinguish the six images from one another by varying the angle. In this case, the present invention makes it possible to reduce cross-talk and flicker.

Examples of the printer used when the printed pixels are expressed in multiple gradients as in FIG. 20 include a thermal sublimation type printer and silver salt photography. Examples of the printer used when the printed pixels are expressed in surface area gradients as in FIG. 21 include an ink jet printer, an offset printer, and a silk screen printer. The control of the present invention can be used for any of these.

Figure 22:
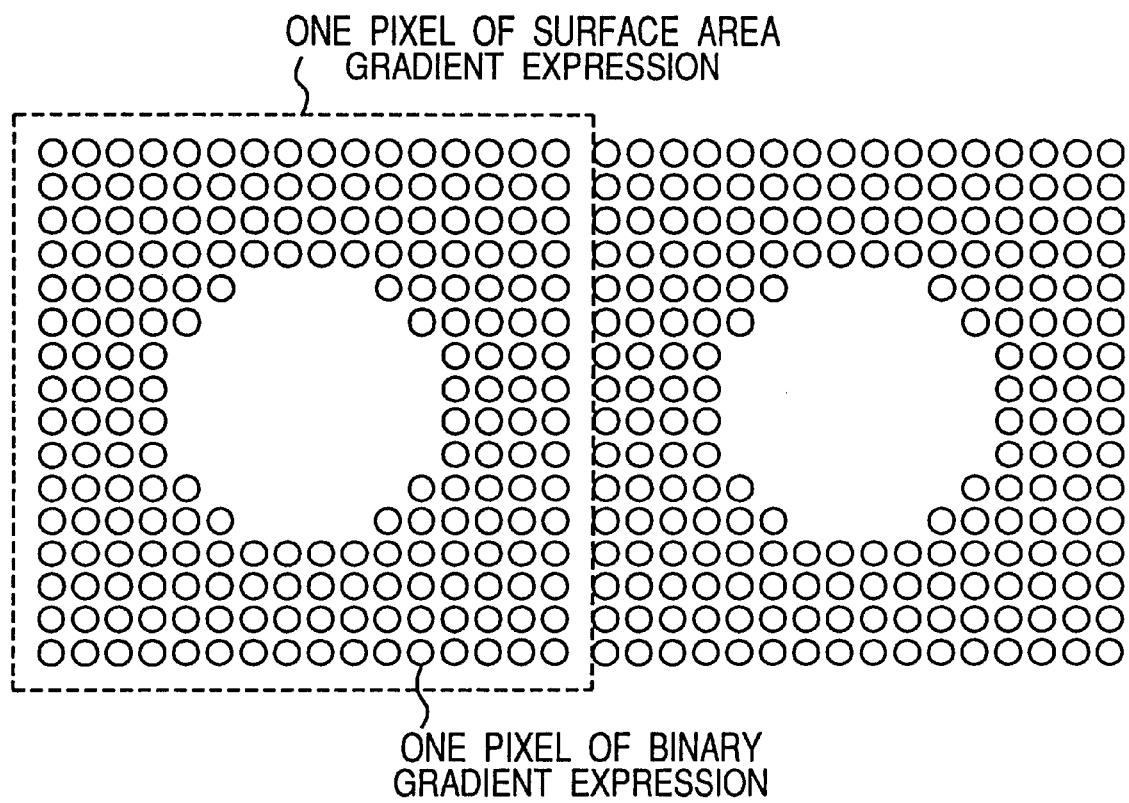
FIG. 22 is an enlarged view of a pixel printed by surface area gradient expression.
Figure 23:
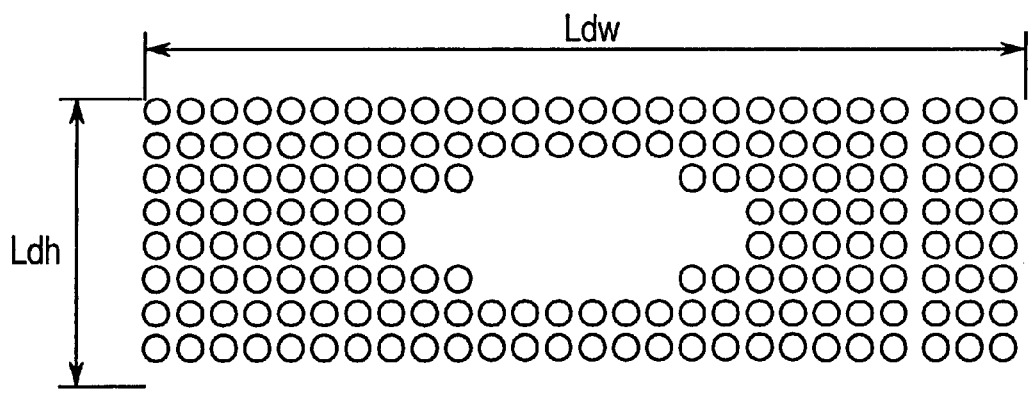
FIG. 23 is an enlarged view of a variation of a pixel printed by surface area gradient expression.

In the case of surface area gradient expression, the shape of a single pixel may be square (FIG. 22) or rectangular (FIG. 23). When surface area gradient expression with a rectangular pixel is used, if the lengthwise direction of a single pixel is oriented in the same direction as the lengthwise direction of the lenticular lens, then N types (given by the following formula) of images can be viewed separately through the lenticular lens.

$$N = (Lp/Lf) = (Ldw/Ldh)$$

Figure 24:
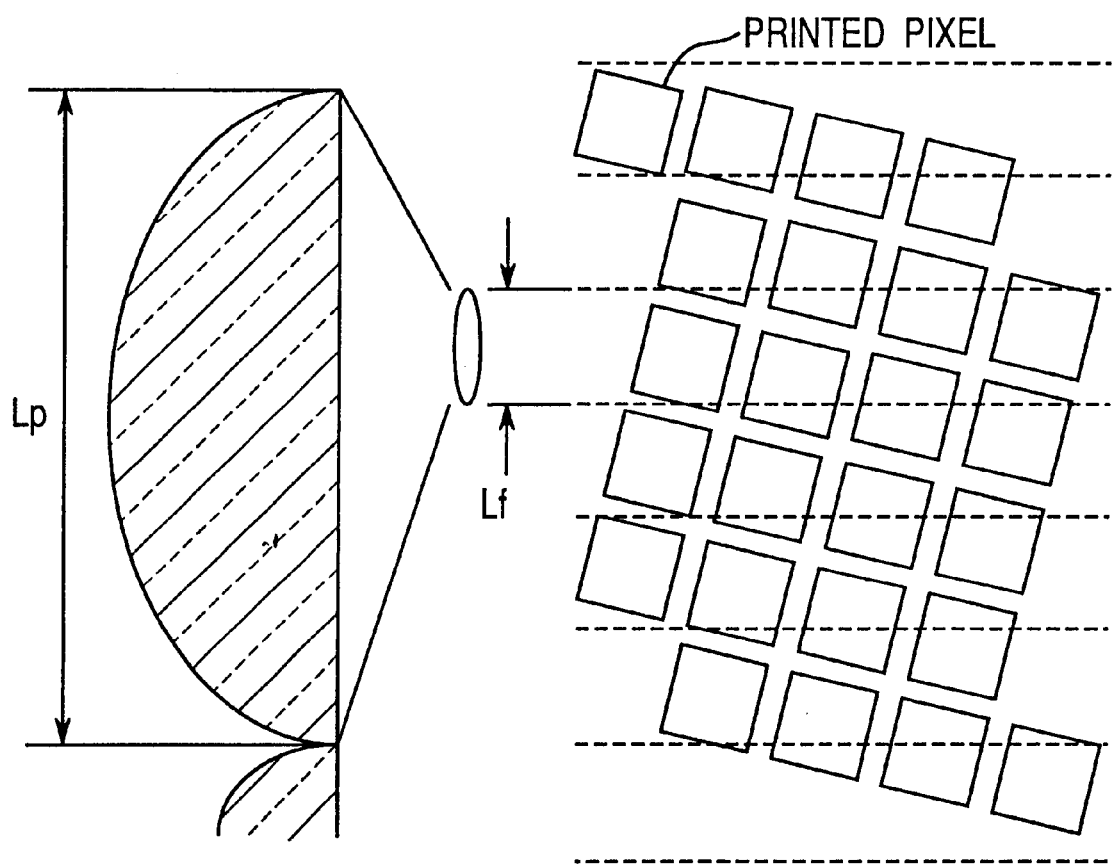
FIG. 24 is a diagram illustrating the relation between the printed pixels and the size of the focal point of the lenticular lens.
Figure 25:
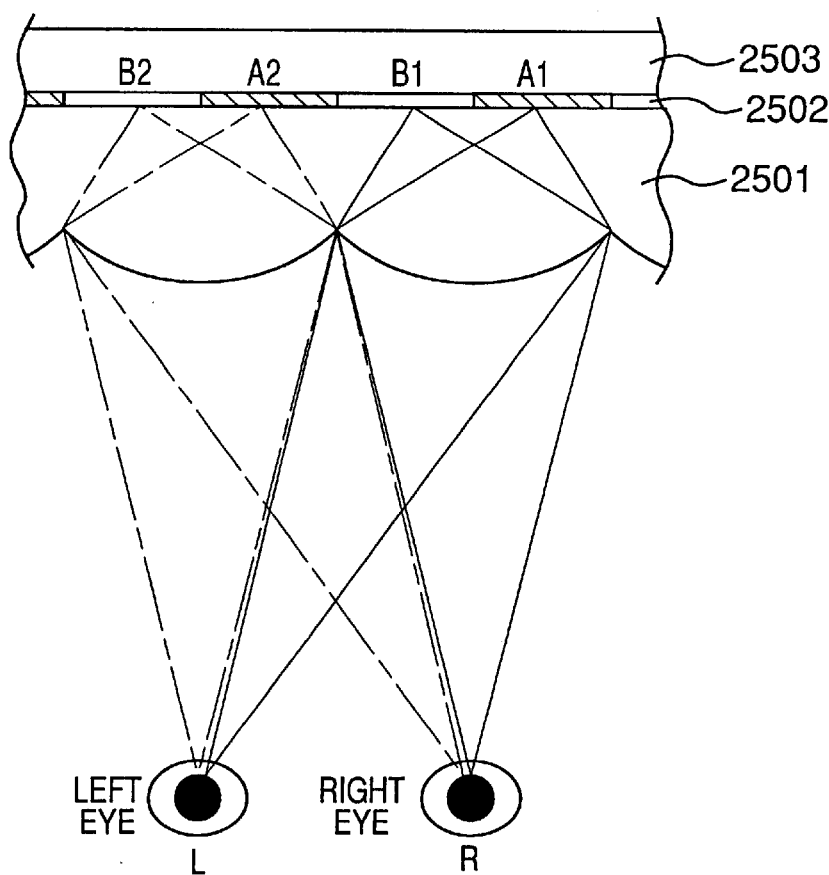
FIG. 25 is a diagram of a three-dimensional image produced with a lenticular lens.
Figure 26:
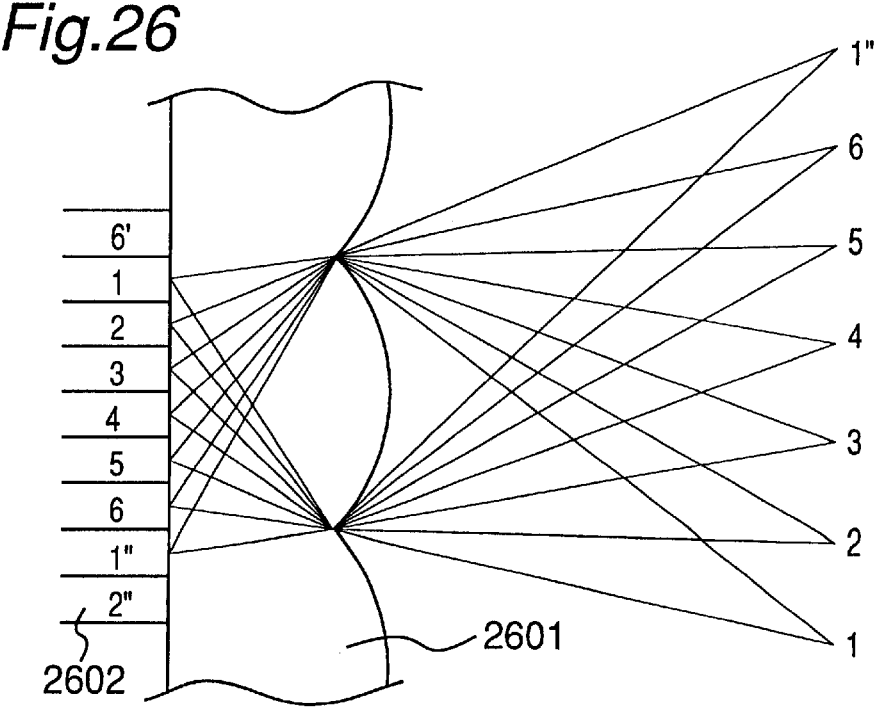
FIG. 26 is a diagram of a moving image produced with a lenticular lens.
Figure 27:
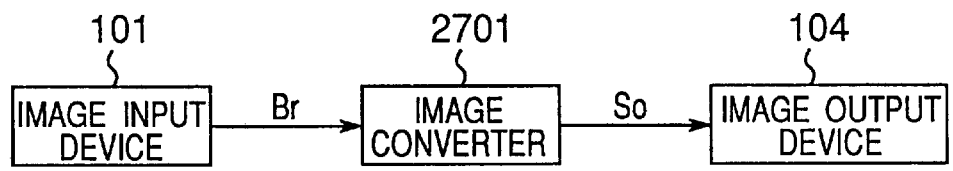
FIG. 27 is a block diagram of the structure of a conventional image printer.
Figure 28:
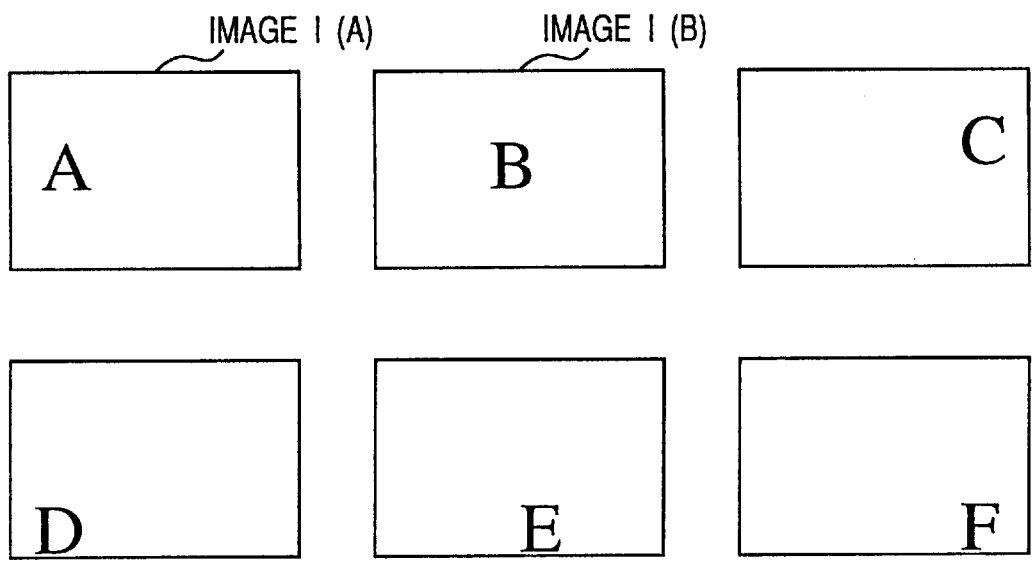
FIG. 28 is a diagram of superposed display images using a lenticular lens.
Figure 29:
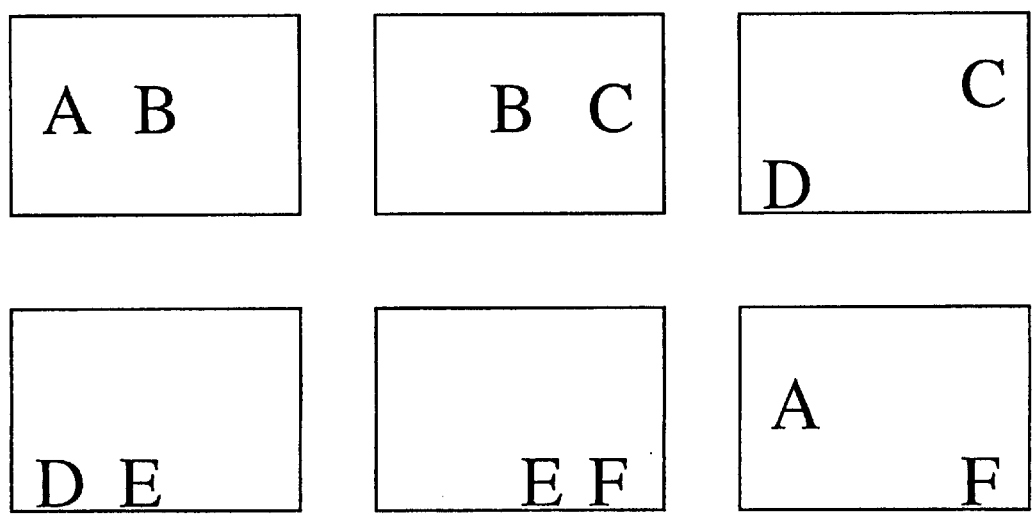
FIG. 29 is a diagram of cross-talk in superposed display images using a lenticular lens.
Figure 30:
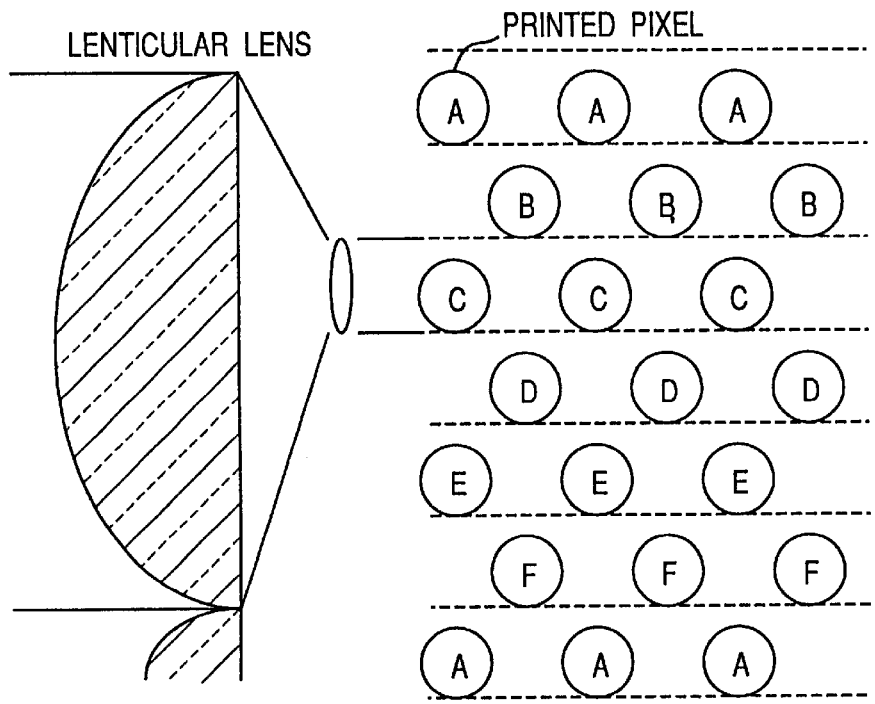
FIG. 30 is a diagram illustrating the relation between the printed pixels and the size of the focal point of the lenticular lens.
Figure 31:
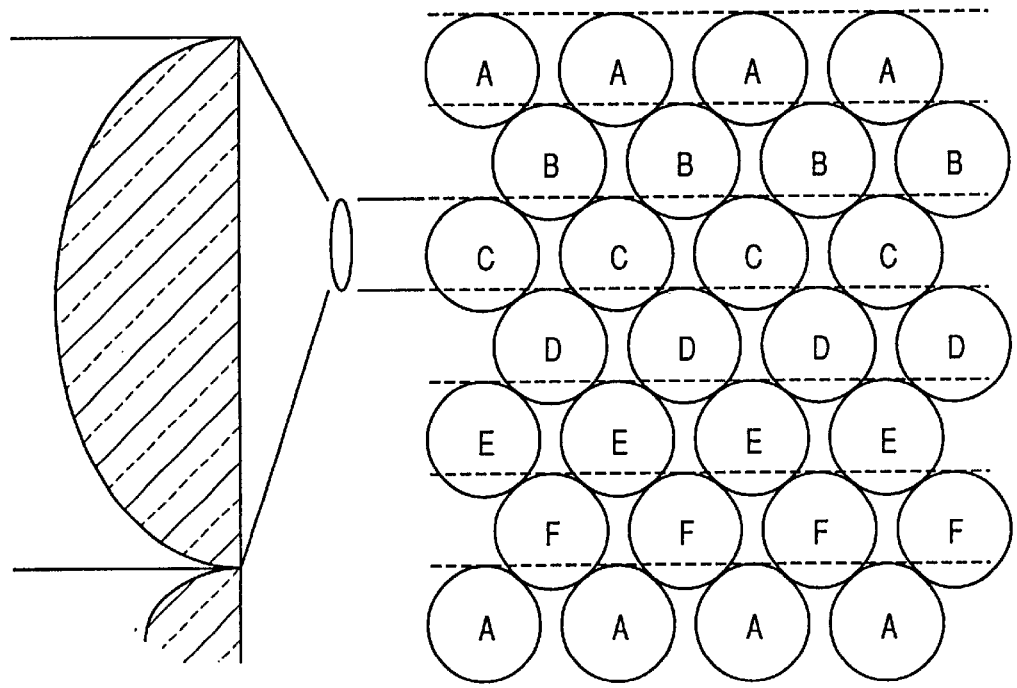
FIG. 31 is a diagram illustrating the relation between the printed pixels and the size of the focal point of the lenticular lens.

Here, Ldh and Ldw are the height and width of the printed pixels, respectively. Flickering will result if the lengthwise direction of the lenticular lens is at an angle to the direction of orientation of the pixels, as shown in FIG. 24.

If Ldw<Lf, the separation of the images will be better and cross-talk can be reduced. Also, when the lengthwise direction of the lenticular lens is oriented in the lateral direction, a greater number of images can fit in if the various square pixels are compressed in the vertical direction so as to produce the laterally rectangular shape shown in FIG. 23. Since the pixels compressed in the vertical direction are expanded in the vertical direction by the lenticular lens, the visual effect is the same as when square pixels are viewed.

The present invention is also characterized in that the direction of the lenticular lens is matched to the printing scan direction. As shown in FIG. 24, if the direction of the lenticular lens is different from the printing scan direction, the edge of the lenticular lens will line up with a pixel dividing line at one end of a single semicircular lenticular lens, but the edge of the lenticular lens will line up with the center of a pixel at the other end. The shading of the pixels cannot be reproduced faithfully if part of the pixels is cut off when the pixels are viewed through the lenticular lens, resulting in color unevenness and flicker. With the present invention, since the printing scan direction is aligned with the direction of the lenticular lens, the pixels can be viewed through the lenticular lens without parts of them being cut off, allowing the shading of the printed pixels to be faithfully reproduced.

As is clear from the above description, an advantage of the present invention is that it provides an image with less flicker and less cross-talk when viewed through a lenticular lens.

Another advantage of the present invention is that a greater number of images can be viewed separately with a lenticular lens even in an image printer with low printing resolution.

What is claimed is:

1. An image printer for printing images, said image printer comprising:
    a correlation value generation device operable to generate a correlation value by taking a difference in brightness between an attentional pixel and pixels that surround the attentional pixel, and setting the correlation value relative to the difference; and
    a pixel shape control device operable to change a size of each of printed pixels relative to the correlation value;
    wherein the size of each of the printed pixels increases as the difference in brightness decreases.

2. An image printer as claimed in claim 1, wherein said pixel shape control device comprises:
    a count device operable to count time increments during a printing period allotted to a single pixel and operable to output a count value as N bits;
    a bit shift device operable to shift a least significant bit of the N-bit count value to a most significant bit and operable to output a corrected count value;
    a switch device operable to select an uncorrected count value from said count device when the correlation value is low and operable to select a corrected count value from said bit shift device when the correlation value is high; and
    a comparison device operable to compare the corrected or uncorrected count value from said switch device with a brightness signal expressing a brightness level of the attentional pixel, and operable to output a signal that raises a printing level when the brightness signal is larger.

3. An image printer as claimed in claim 2, wherein the brightness signal is expressed as (N−1) bits or a smaller number of bits.

4. An image printer as claimed in claim 1, said image printer further comprising:
    a device operable to detect whether pixels with a high correlation value are present around a pixel with a low correlation value and operable to designate the pixel with a low correlation value as a boundary pixel; and
    a position control device operable to control a pixel position such that the boundary pixel is moved towards the pixels with a high correlation value.

5. An image printer as claimed in claim 1, said image printer further comprising:
    a device operable to detect pixels with a high correlation value; and
    a density control device operable to control a pixel density so that the pixels with a high correlation value will be printed a plurality of times.

6. An image printer as claimed in claim 1, said image printer further comprising:
    a device operable to distinguish between pixels with a low correlation value and pixels with a high correlation value; and
    a device operable to perform gamma correction separately for pixels with high and low correlation values.

7. An image printer as claimed in claim 1, wherein said image printer is an image printer operable to print images viewed in combination with a lenticular lens, and wherein an angle in a direction of the lenticular lens is matched to that in a print scan direction.

8. An image printer as claimed in claim 1, wherein said image printer is an image printer operable to print images viewed in combination with a lenticular lens, and wherein a shape of printed pixels is varied via a lens pitch of the lenticular lens.

9. An image printer as claimed in claim 1, wherein said image printer is an image printer operable to print images viewed in combination with a lenticular lens, and wherein said image printer further comprises:
    an output shape detector operable to detect a shape of the lens and operable to control said pixel shape controller so that large dots are formed when the lens shape is large and small dots are formed when the lens shape is small.

10. An image printer for printing images, said image printer comprising:
    a correlation value generation means for generating a correlation value by taking a difference in brightness between an attentional pixel and pixels that surround the attentional pixel, and setting the correlation value relative to the difference; and
    a pixel shape control means for changing a size of each of printed pixels relative to the correlation value;
    wherein the size of each of the printed pixels increases as the difference in brightness decreases.

11. An image printing method for printing images, said method comprising:
    generating a correlation value by taking a difference in brightness between an attentional pixel and pixels that surround the attentional pixel;
    setting the correlation value relative to the difference; and
    changing a size of each of printed pixels relative to the correlation value;
    wherein the size of each of the printed pixels increases as the difference in brightness decreases.

12. An image printing method as claimed in claim 11, said method further comprising:
- counting time increments during a printing period allotted to a single pixel and outputting a count value as N bits;
- shifting a least significant bit of the N-bit count value to a most significant bit and outputting a corrected count value;
- selecting an uncorrected count value when the correlation value is low and selecting a corrected count value when the correlation value is high; and
- comparing the corrected or uncorrected count value from said selecting with a brightness signal expressing a brightness level of the attentional pixel, and outputting a signal that raises a printing level when the brightness signal is larger.

13. An image printing method as claimed in claim 12, wherein the brightness signal is expressed as (N−1) bits or a smaller number of bits.

14. An image printing method as claimed in claim 11, said method further comprising:
- detecting whether pixels with a high correlation value are present around a pixel with a low correlation value and designating the pixel with a low correlation value as a boundary pixel; and
- controlling a pixel position such that the boundary pixel is moved towards the pixels with a high correlation value.

15. An image printing method as claimed in claim 11, said method further comprising:
- detecting pixels with a high correlation value; and
- controlling a pixel density so that the pixels with a high correlation value will be printed a plurality of times.

16. An image printing method as claimed in claim 11, said method further comprising:
- distinguishing between pixels with a low correlation value and pixels with a high correlation value; and
- performing gamma correction separately for pixels with high and low correlation values.

17. An image printing method as claimed in claim 11, wherein said image printing method is performed using an image printer operable to print images viewed in combination with a lenticular lens, and wherein an angle in a direction of the lenticular lens is matched to that in a print scan direction.

18. An image printing method as claimed in claim 11, wherein said image printing method is performed using an image printer operable to print images viewed in combination with a lenticular lens, and wherein a shape of printed pixels is varied via a lens pitch of the lenticular lens.

19. An image printing method as claimed in claim 11, wherein said image printing method is performed using an image printer operable to print images viewed in combination with a lenticular lens, and wherein said image printing method further comprises:
- detecting a shape of the lens and controlling said changing of the size of each of the printing pixels so that large dots are formed when the lens shape is large and small dots are formed when the lens shape is small.

20. An image printer for printing images, said image printer comprising:
- a correlation value generator operable to generate a correlation value for a pixel by taking a difference in brightness between an attentional pixel and pixels that surround the attentional pixel, and setting the correlation value relative to the difference; and
- a pixel shape control device operable to change a size of each of printed pixels relative to the correlation value;
- wherein the size of each of the printed pixels increases as the difference in brightness decreases.

21. An image printing method for printing images, said method comprising:
- generating a correlation value for a pixel by taking a difference in brightness between an attentional pixel and pixels that surround the attentional pixel, and setting the correlation value relative to the difference; and
- controlling a printing signal for the pixel in response to the correlation value to change a size of each of the printed pixels relative to the correlation value;
- wherein the size of each of the printed pixels increases as the difference in brightness decreases.

* * * * *